United States Patent [19]

Scruggs

[11] 4,171,851
[45] Oct. 23, 1979

[54] WHEEL COVER LOCKING DEVICE

[76] Inventor: Charles Scruggs, 8033 S. Essex, Chicago, Ill. 60617

[21] Appl. No.: 920,440

[22] Filed: Jun. 29, 1978

[51] Int. Cl.$^2$ ............................................. B60B 7/00
[52] U.S. Cl. .................................. 301/37 AT; 70/164
[58] Field of Search .......... 301/37 R, 37 AT, 37 CM, 301/108 SC, 108 R; 70/15, 18, 49, 53, 58, 259, 164; 220/375, 210

[56] References Cited

U.S. PATENT DOCUMENTS

| | | | |
|---|---|---|---|
| 2,601,017 | 6/1952 | Herrick | 301/108 R |
| 4,044,577 | 8/1977 | Horlacher | 70/49 |
| 4,083,606 | 4/1978 | Scruggs | 301/37 AT |
| 4,098,099 | 7/1978 | Smith | 70/18 |

Primary Examiner—H. Grant Skaggs
Attorney, Agent, or Firm—Ladas, Parry, Von Gehr, Goldsmith & Deschamps

[57] ABSTRACT

A wheel cover locking device is provided for securing an ornamental wheel cover to the lug of the vehicle wheel. An adjustable cable tightening device is arranged beneath the wheel cover with one end of a cable secured to a wheel lug by the wheel lug nut. A rotatable locking bolt is passed through the wheel cover and threadably engages a spool to which the other end of the cable is attached whereby on rotation of the locking bolt by use of a special key, the spool will wind the cable in a tightened position to firmly secure the wheel cover to the vehicle wheel.

3 Claims, 1 Drawing Figure

WHEEL COVER LOCKING DEVICE

BACKGROUND OF THE INVENTION

The invention concerns an improved wheel cover locking device adapted to be secured to a wheel lug to prevent removal of a wheel cover from a vehicle wheel. The invention is particularly useful in protecting ornamental wheel covers having increasing commercial value.

The present invention is a particular improvement over the wheel cover locking device disclosed and claimed in my U.S. Pat. No. 4,083,606, issued on Apr. 11, 1978. In my prior device a wheel covering locking device included a generally "C" shaped bracket with an extension secured to a wheel lug with an adjustable lug mounting assembly including a wheel cover lock and cap, a spacer device, lock washers and threaded fasteners.

The prior device could be easily manufactured to fit a particular automotive vehicle, but it was not easily adapted for use with any vehicle, particularly those having wheels of different diameters as well as wheel covers of various dimensions. Moreover, the prior device would have to be adapted or modified to accommodate vehicles having different clearances between the extending wheel axle hub and the overlying wheel cover.

SUMMARY OF THE INVENTION

The present invention provides an improved wheel cover locking device which is easily adapted for use with any vehicular wheel and which will secure a wheel cover to a wheel lug regardless of the dimensions of the wheel or configuration of the wheel axle hub. The invention further avoids need for brackets or other mounting devices which depend on various dimensions of the wheel lug spacing from the center axis of the wheel and yet will provide suitable security and easy mounting to preclude the theft of the wheel cover. This has become an increasingly important problem in view of the various ornamental designs of wheel covers and the considerable resale values of the same. In effect the only way to remove the wheel cover without utilizing the key would be to bend or disfigure the wheel cover which would of course reduce its value for resale.

BRIEF DESCRIPTION OF THE DRAWING

The FIGURE shows an expanded, schematic view of a preferred embodiment of the improved wheel cover locking device with the parts separated and aligned to show the manner of assembly.

DETAILED DESCRIPTION OF THE INVENTION

Figure 1:
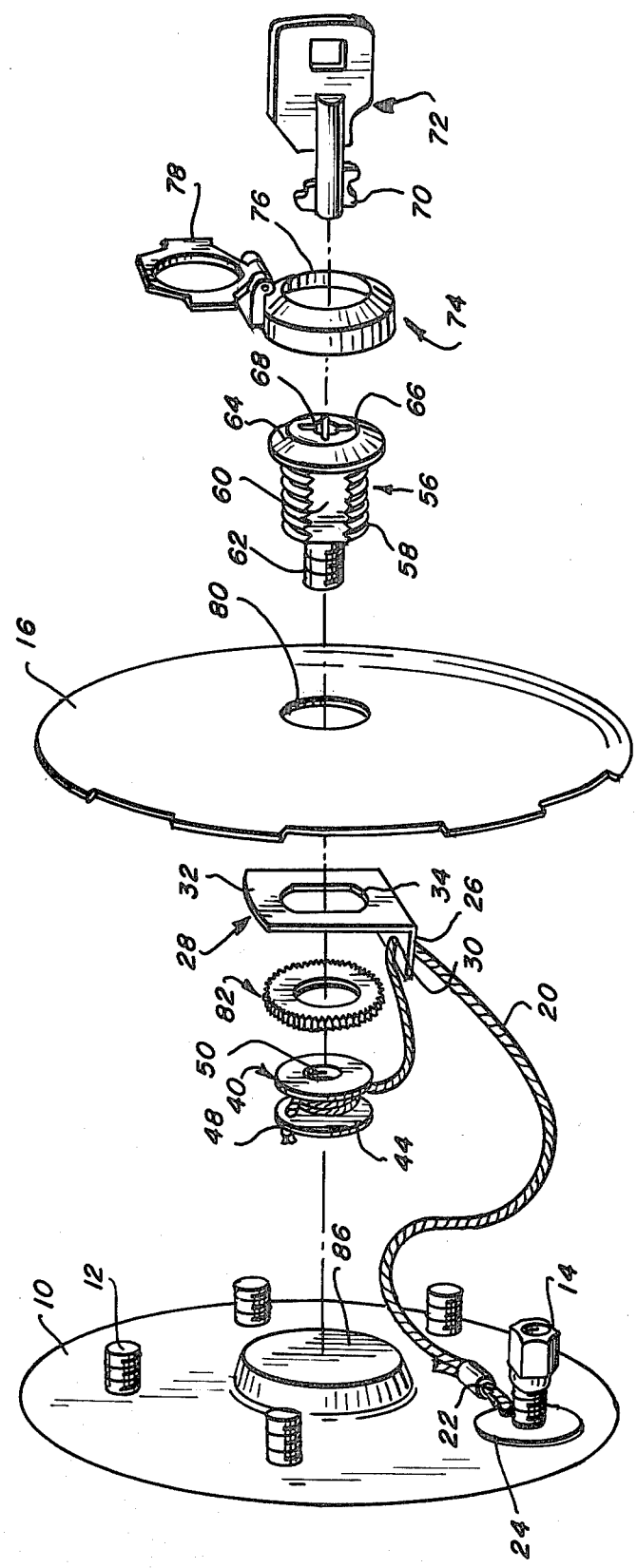

Referring to the drawing there is shown an expanded, schematic view of an embodiment of the invention associated with a vehicle wheel 10. The wheel includes several wheel lug bolts 12 of which only two are shown in the drawing. Each lug bolt is adapted to receive a threaded wheel lug nut 14.

The improved locking device is an assembly of parts which conveniently and simply will secure a wheel cover 16 to the vehicle 10 in the manner described below.

The locking device includes a cable 20 which can be made of any suitable material such as a braided steel cable of a dimension to permit adjustable tightening as will be described below. At one end of cable 20 is a looped end 22 which has been fastened to a washer 24 having an inside diameter to accommodate mounting on the wheel lug bolt 12. It will be understood that the looped end of the cable 22 could be directly mounted on the wheel lug bolt 12 but the use of a mounting washer prevents the possibility of separating or fraying the cable fragments or strands.

The cable 20 is arranged to pass through a base portion 26 of an L-shaped bracket 28 by means of an aperture 30 in the angled base portion. The bracket includes a main face 32 at right angles to the base 26, the face including a shaped slot 34 for receiving a lock bolt as will be described below. The cable 20 is of a sufficient length to be secured to a spool 40. This spool includes a central cylinder 42 and a pair of annular end walls 44, one of which is provided with a suitable aperture 46 through which the end of the cable 20 extends. A retainer 48 prevents the cable end from being removed through the spool end wall 44. The spool is arranged for rotation in a manner to be described below whereby the cable 20 will be wound around the central cylinder 42 which will effectively shorten the length of the cable extending to the wheel lug bolt 12 to which the other end of the cable 22 is secured as described above. The spool 40 is provided with an axially extending threaded bore adapted to receive a lock bolt as will be described below.

Lock bolt 56 is shown to include a threaded lock main stem 58 having a pair of flattened stem portions 60 on opposite sides thereof. The configuration of main stem 58 is complementary with the shaped slot 34 in the L-shaped bracket face 32. Lock bolt 56 further includes a threaded extension stem 62 having a configuration to threadably engage the complementary bore 50 in the spool 40 upon assembly of the device.

Lock bolt 56 is further provided with a chamfered head 64 having a flattened end face 66 provided with a slotted keyhole 68 specially configured to receive the working end 70 of a key 72. Lock bolt 56 and key 72 are complementary, commercially available items which generally are manufactured in limited quantities for each configured key and slotted hole, as will be understood to persons having a familiarity with such devices.

Lock bolt 56 is further configured to provide for separate rotatable action between the main stem 58 and the extension stem 62. This can be accomplished in any suitable manner, for example, by having the lock bolt with a central cylinder (not shown) which can be depressed by the user pushing the key inwardly whereby rotation of the key will turn the main stem to a tightened position in use and by depressing the key and continuing rotation the threaded extension stem will continue rotation. Another commercially available lock bolt permits rotation of the extension stem without axial depression. Such locks are manufactured by the Chicago Lock Company or the Fort Lock Co., Chicago, Illinois.

Optionally, a lock cover can be provided to protect the face 66 of the lock bolt 56. In the illustrated embodiment the lock cover 74 includes a ring 78 adapted to fit over the chamfered head 64 of the bolt 56, and held in place with a suitable lip portion (not shown). The ring 76 further has a hinged cover 78 adapted to overlie the face 66 of bolt 56. The lock cover 74 is advantageous in protecting the bolt face but it is not essential to the invention.

To assemble the locking device a cable 20 is secured to the vehicle wheel as described above utilizing the washer 24 and the wheel lug nut 14 for securing end 22 of the cable to the wheel while the other end of the cable 20 is secured to the spool 40, after the cable has been passed through the L-shaped bracket 28.

Wheel cover 16 is provided with a centrally disposed aperture 80 to receive the lock bolt main stem 58. The bolt passes through the aperture 80 and the main stem is passed through the specially shaped slot 34 of the face 32 of the bracket 28. A lock nut 82 is threadably mounted on the main stem 58 and manually tightened to secure the bracket to the underside of wheel cover 16 with the head 64 of the lock bolt being tightened to the outer face of the wheel cover 16 and overlying the aperture 80.

Next, the spool 40 is threadably rotated onto the extension stem 62 of the lock bolt whereupon the preliminary assembly of the device is completed.

At this point the wheel cover 16 is laid over the vehicle wheel 10 and fastened in a typical manner, as by gentle pounding of the rim of the wheel cover to engage corresponding grooved means (not shown) provided around the rim of vehicle wheel 10.

The operator then inserts the key 72 in the slotted hole 68 of the lock bolt 56 and proceeds to tighten the same by rotation in one direction to assure that the lock stem will be securely fastened to the wheel cover. By continuing the rotation movement, the threaded extension stem 62 of the bolt will also cause rotation of the spool 40 to continue to wind the cable 20 about the cylinder 42. Such rotation movement is continued until the cable has been wound about the cylinder 42 whereby the wheel cover will be tightly held to the wheel and the key then can be removed.

Unwanted removal of the wheel cover 16 by counter-rotation thereof will be prevented by the usual tight fit of the wheel cover to the wheel. In addition the tire valve stem 84 extends through an aperture in the wheel cover 16.

It will be appreciated that the assembled device is compact, such that a clearance will be provided between the spool 40 and the vehicle wheel axle hub 86 without requiring modifications of the locking device.

Accordingly, it will be understood that the invention provides an improved wheel cover locking device which is easy to assemble but will provide a surprisingly secure mounting of the wheel cover to a vehicle wheel without need for special modification or adaptation to accommodate vehicle wheels of varying sizes or axle hubs of different configurations.

While the invention has been described with respect to a preferred embodiment thereof, it is to be understood that the invention is not to be so limited since changes and modifications can be made therein which are within the full intended scope of the invention as defined by the appended claims.

What is claimed is:

1. A wheel cover locking device adapted to secure a vehicle wheel cover to the wheel of a vehicle, comprising cable means having a mounting means at one end adapted to be secured to a wheel lug bolt of the vehicle wheel, bracket means carried by said cable means, the other end of said cable means being secured to a spool member, said spool member having a generally cylindrical center portion with annular end walls and an axially extending threaded bore therein, said bracket means including an elongated slot in one portion and an aperture in another portion through which said cable means is passed, a lock bolt having a threaded main stem with a pair of flattened surfaces on opposite sides thereof, a threaded extension stem having a smaller diameter than said main stem, said extension stem being independently rotatable relative to said main stem, said lock bolt further including an enlarged head portion having a slotted face adapted to receive a corresponding key, said lock bolt extension stem being rotatable by operation of said key inserted in said slotted face, said threaded main stem being adapted to receive, in sequence, below said head portion, an associated wheel cover having a centrally disposed aperture to accommodate said threaded main stem, said elongated slot of said bracket means configured to accommodate said threaded main stem and flattened opposed surfaces thereon, a lock nut adapted to threadably engage said main stem of said lock bolt to secure said bracket means and said associated wheel cover on said main stem below said enlarged head portion of said lock bolt, and said spool member adapted to threadably engage said extension stem on said lock bolt, whereby rotation of said extension stem relative to said assembled main stem, bracket means and lock nut, will rotate said spool and draw said cable means about said cylindrical center portion to thereby shorten the effective length of said cable means and tighten said assembled device with respect to said one end of said cable means secured to said wheel lug bolt.

2. The device of claim 1, wherein said bracket means comprises an "L" shaped bracket having a flat base part including said aperture to receive said cable means, and a flat face integral with and perpendicular to said base part, said bracket face including said elongated slot, said cable mounting means including at said first end thereof an annular washer adapted to overlie said wheel lug of said vehicle wheel, said washer including an aperture through which said cable means extends, means securing said cable end in said assembled condition with said washer means.

3. A wheel cover locking device for securing a wheel cover to a lug of a vehicle wheel, comprising an annular washer mounted on said wheel lug by means of a wheel lug nut, an elongated cable secured to said washer to thereby fasten one end of said cable to said wheel, an "L" shaped bracket having a foot and an integral leg arranged perpendicular to each other, said bracket foot including an aperture to receive said cable, said bracket leg including an elongated slot having parallel opposed straight side edges and opposed arcuate end edges, a spool member having a central cylindrical portion and a pair of annular end walls of a larger diameter than said cylindrical portion, said cable having its other end secured to one of said spool end walls, said cable being wound about said central cylindrical portion of said spool, said spool further including a threaded bore extending axially of said central cylindrical portion, a wheel cover having a rim which is adapted to be secured to said wheel, said wheel cover including a centrally disposed annular opening having a diameter corresponding generally to the distance between said arcuate slot end portions of said bracket leg, a lock bolt having an enlarged head adapted to overlie the opening in said wheel cover, and a threaded main stem, a pair of opposed flattened surfaces configured in said main stem corresponding to said straight side edges of said bracket slot, said lock bolt passing through in sequence, said wheel cover aperture and said bracket slot, a lock nut engageable with said threaded main stem of said lock bolt to secure said lock bolt to said wheel cover and said bracket on said threaded main stem, said bracket and lock bolt main stem being non-rotatable relative to each other, said lock bolt further including a threaded extension stem adapted to engage the threaded bore of said spool member, said lock bolt including a slotted end face on said enlarged head adapted to receive a correspondingly configured key, said extension stem being independently rotatable relative to said main stem upon rotation of a key in said slotted end face, and a lock cover mounted to overlie said slotted end face of said lock bolt head, said cover including a pivotable lid adapted to be pivoted away from said lock bolt head end face to provide access to said slotted keyhole therein.

* * * * *